United States Patent
Katsuyama

(10) Patent No.: US 8,983,723 B2
(45) Date of Patent: Mar. 17, 2015

(54) VEHICLE BRAKING/DRIVING FORCE CONTROL SYSTEM AND VEHICLE BRAKING/DRIVING FORCE CONTROL METHOD

(75) Inventor: Etsuo Katsuyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 152 days.

(21) Appl. No.: 13/877,539

(22) PCT Filed: Oct. 20, 2011

(86) PCT No.: PCT/IB2011/002512
§ 371 (c)(1),
(2), (4) Date: Apr. 3, 2013

(87) PCT Pub. No.: WO2012/052831
PCT Pub. Date: Apr. 26, 2012

(65) Prior Publication Data
US 2013/0218388 A1     Aug. 22, 2013

(30) Foreign Application Priority Data
Oct. 21, 2010 (JP) .................... 2010-236095

(51) Int. Cl.
*B60T 8/1755* (2006.01)
*B60T 8/1769* (2006.01)
(Continued)

(52) U.S. Cl.
CPC ............. *B60L 7/18* (2013.01); *B60T 8/17555* (2013.01); *B60T 8/1769* (2013.01); *B60L 15/20* (2013.01);
(Continued)

(58) Field of Classification Search
CPC ............. B60T 8/17555; B60T 8/1769; B60T 2260/06; B60T 2270/302; B60T 2270/303; Y02T 10/7258; B60L 7/18; B60L 15/20; B60L 7/14; B60L 7/26; B60L 11/1803; B60L 15/2009; B60L 2270/145; B60L 2220/14; B60L 2220/44; B60L 2240/12; B60L 2240/14; B60L 2240/24; B60L 2240/423; B60L 2250/26; B60L 2260/28
USPC ..................... 701/1, 22, 36, 38, 99; 477/182; 303/146, 152, 172, 189; 903/930, 947; 180/6.5, 65.1, 65.21, 65.51; 703/2
See application file for complete search history.

(56) References Cited

U.S. PATENT DOCUMENTS 5,897,130 A * 4/1999 Majeed et al. ............. 280/5.507
6,330,483 B1 * 12/2001 Dailey ........................... 700/28
(Continued)

FOREIGN PATENT DOCUMENTS

DE    10 2008 032 754 A1    7/2009
EP        1 864 879 A1    12/2007
(Continued)

*Primary Examiner* — Russell Frejd
(74) *Attorney, Agent, or Firm* — Oliff PLC

(57) ABSTRACT

Braking/driving force control that includes: detecting a driver's operating state for causing the vehicle to run; detecting a vehicle body motional state while the vehicle is running; computing a target longitudinal driving force for causing the vehicle to run and motional state amounts for controlling a vehicle body behavior on the basis of the detected operating state and motional state; and computing driving or braking forces allocated to the wheels so as to achieve the computed target longitudinal driving force and target motional state amounts and that the braking/driving force generating mechanism causes the wheels to generate independently.

9 Claims, 4 Drawing Sheets

(51) Int. Cl.
*B60L 7/18* (2006.01)
*B60L 15/20* (2006.01)
*B60L 7/14* (2006.01)
*B60L 7/26* (2006.01)
*B60L 11/18* (2006.01)
*G06F 17/10* (2006.01)

(52) U.S. Cl.
CPC ... B60L 7/14 (2013.01); B60L 7/26 (2013.01); B60L 11/1803 (2013.01); B60L 15/2009 (2013.01); *B60T 2260/06* (2013.01); *B60T 2270/302* (2013.01); *B60T 2270/303* (2013.01); *Y02T 10/7258* (2013.01); *B60L 2220/14* (2013.01); *B60L 2220/44* (2013.01); *B60L 2240/12* (2013.01); *B60L 2240/14* (2013.01); *B60L 2240/24* (2013.01); *B60L 2240/423* (2013.01); *B60L 2250/26* (2013.01); *B60L 2260/28* (2013.01); *B60L 2270/145* (2013.01); *Y10S 903/93* (2013.01); *Y10S 903/947* (2013.01)
USPC ............ 701/38; 701/22; 703/2; 303/146; 303/152; 303/172; 303/189; 903/930; 903/947; 180/6.5; 180/65.51

(56) References Cited

U.S. PATENT DOCUMENTS

| | | | |
|---|---|---|---|
| 6,862,512 B2* | 3/2005 | Arndt et al. | 701/70 |
| 7,337,047 B2* | 2/2008 | Ueno et al. | 701/38 |
| 7,386,379 B2* | 6/2008 | Naik et al. | 701/41 |
| 2006/0076740 A1 | 4/2006 | Sugiyama | |
| 2009/0108671 A1* | 4/2009 | Maeda et al. | 303/146 |
| 2009/0254251 A1* | 10/2009 | Sato | 701/41 |

FOREIGN PATENT DOCUMENTS

| | | |
|---|---|---|
| JP | A-2006-109642 | 4/2006 |
| JP | A-2007-110836 | 4/2007 |
| JP | A-2007-118898 | 5/2007 |
| JP | A-2007-131212 | 5/2007 |
| JP | A-2009-143310 | 7/2009 |
| JP | A-2009-184575 | 8/2009 |
| JP | A-2012-30760 | 2/2012 |

* cited by examiner

VEHICLE BRAKING/DRIVING FORCE CONTROL SYSTEM AND VEHICLE BRAKING/DRIVING FORCE CONTROL METHOD

BACKGROUND OF THE INVENTION

1. Field of the Invention

The invention relates to a vehicle braking/driving force control system and vehicle braking/driving force control method that individually control driving force or braking force to be generated by each wheel of the vehicle.

2. Description of Related Art

In recent years, there has been developed a so-called in-wheel motor-type vehicle as one mode of an electric vehicle. In the in-wheel motor-type vehicle, an electric motor (motor) is arranged inside or near each wheel, and each wheel is directly driven by the electric motor. In the in-wheel motor-type vehicle, electric motors provided respectively for wheels (drive wheels) are individually subjected to rotation control, that is, the electric motors are individually subjected to power running control or regenerative control, to individually control driving torque or braking torque applied to each drive wheel to thereby make it possible to appropriately control the driving force and braking force of the vehicle in response to a running condition.

Then, there has been suggested a control system that uses the function of individually controlling driving torque or braking torque applied to each driving wheel in this way to suppress a change in the behaviors of a vehicle body. For example, Japanese Patent Application Publication No. 2007-110836 (JP-A-2007-110836) describes a vehicle braking/driving force control system that applies different braking/driving forces to respective driving wheels to control pitch moment and yaw moment generated about the barycenter of the vehicle in order to suppress vibrations of the vehicle in the vertical direction (pitch rate) resulting from the pitch behavior that occurs when the vehicle runs over a step, or the like, of a road surface and to stabilize the yaw behavior in the yaw direction. In addition, JP-A-2007-110836 describes a vehicle control system that independently controls braking/driving force of each driving wheel to control the roll behavior of a vehicle body. Furthermore, Japanese Patent Application Publication No. 2006-109642 (JP-A-2006-109642) describes a vehicle braking/driving force control system that individually controls the braking/driving force of each wheel to control the bouncing behavior of a vehicle body.

Incidentally, in the above control systems, the driving force or braking force of each driving wheel is controlled to control the behaviors of the vehicle body (sprung mass) arranged on springs, that is, on suspension mechanisms utilizing suspension reaction force generated by the suspension mechanisms. However, the above control systems each control only a single behavior, that is, a pitch behavior, a yaw behavior, a roll behavior or a bouncing behavior. In this case, when driving force or braking force of each driving wheel is controlled, that is, a driving force allocation is controlled, to, for example, control the pitch behavior or the roll behavior while controlling the yaw behavior, control of each of these behaviors may influence another behavior. Thus, in the case where the yaw behavior, the pitch behavior and the roll behavior each are independently controlled, it is difficult to control the behaviors at the same time only by a simple combination of these controls, so a favorable ride comfort may not be obtained.

SUMMARY OF THE INVENTION

The invention provides a vehicle braking/driving force control system and vehicle braking/driving force control method that control braking/driving force of each driving wheel to control a plurality of behaviors of a vehicle body at the same time while causing the vehicle to run appropriately.

A first aspect of the invention relates to a vehicle braking/driving force control system. The vehicle braking/driving force control system includes a braking/driving force generating mechanism that causes wheels of a vehicle to respectively generate driving forces or braking forces independently of one another, and a suspension mechanism that couples each of the wheels that are not supported by springs of the vehicle to a vehicle body that is supported by the springs of the vehicle, and controls the braking/driving force generating mechanism to cause the wheels to respectively generate driving forces or braking forces independently of one another. The vehicle braking/driving force control system includes: an operating state detecting unit that detects a driver's operating state for causing the vehicle to run; a motional state detecting unit that detects a motional state of the vehicle body while the vehicle is running; a vehicle body behavior control value computing unit that computes a target longitudinal driving force for causing the vehicle to run and a plurality of target motional state amounts for controlling behaviors of the vehicle body on the basis of the detected operating state and the detected motional state; and a driving force allocation computing unit that computes driving forces or braking forces that are respectively allocated to the wheels so as to achieve the computed target longitudinal driving force and the plurality of computed target motional state amounts and that the braking/driving force generating mechanism causes the wheels to respectively generate independently of one another.

In the braking/driving force control system, the driving force allocation computing unit may compute driving forces or braking forces that the braking/driving force generating mechanism causes the wheels to respectively generate independently of one another on the basis of arrangement of the wheels and suspension mechanisms of the vehicle using an allocation geometrically determined so as to achieve the computed target longitudinal driving force and the plurality of computed target motional state amounts.

The braking/driving force control system may further include a gain computing unit that, when the allocated and computed driving forces exceeds a maximum driving force of the braking/driving force generating mechanism or when the allocated and computed braking forces exceeds a maximum braking force of the braking/driving force generating mechanism, computes a gain by which driving forces or braking forces for achieving the plurality of computed target motional state amounts within the allocated and computed driving forces or braking forces are reduced.

In the braking/driving force control system, the gain computing unit may compute the gain in such a manner that values obtained by subtracting driving forces for achieving the computed target longitudinal driving force within the allocated and computed driving forces from the maximum driving force are divided by the driving forces for achieving the plurality of target motional state amounts or values obtained by subtracting braking forces for achieving the computed target longitudinal driving, force within the allocated and computed braking forces from the maximum braking force are divided by the braking forces for achieving the plurality of target motional state amounts. In addition, in the braking/driving force control system, the maximum driving force and the maximum braking force may be determined on the basis of a ground contact state of the wheels.

In the braking/driving force control system, the braking/driving force generating mechanism may include electric motors that are respectively assembled to the wheels of the vehicle, and the braking/driving force control system may further include a torque computing unit that computes driving torques or braking torques respectively generated by the electric motors in correspondence with the allocated and computed driving forces or braking forces. In addition, in the braking/driving force control system, the braking/driving force generating mechanism may cause left and right front wheels and left and right rear wheels of the vehicle to respectively generate driving forces or braking forces independently of each other, the driving force allocation computing unit may compute driving forces or braking forces that are allocated to the left and right front wheels and the left and right rear wheels in order to achieve the computed target longitudinal driving force and the plurality of computed target motional state amounts and that the braking/driving force generating mechanism causes the left and right front wheels and the left and right rear wheels to respectively generate independently of each other.

The braking/driving force control system may further include an input unit to which the detected operating state and the detected motional state are input, wherein the vehicle body behavior control value computing unit may compute a target longitudinal driving force for causing the vehicle to run and a plurality of target motional state amounts for controlling behaviors of the vehicle body on the basis of the operating state and the motional state that are input by the input unit.

In the braking/driving force control system, each of the target motional state amounts may be a target value of any one of a vertical acceleration in a vertical direction of the vehicle body, a lateral acceleration in a transverse direction of the vehicle body, a vehicle speed of the vehicle body, a yaw rate of the vehicle body, a pitch rate of the vehicle body, a roll rate of the vehicle body, a yaw moment of the vehicle body, a pitch moment of the vehicle body and a roll moment of the vehicle body.

A second aspect of the invention relates to a braking/driving force control method that, in a vehicle that includes a braking/driving force generating mechanism that causes wheels of the vehicle to respectively generate driving forces or braking forces independently of one another and a suspension mechanism that couples each of the wheels that are not supported by springs of the vehicle to a vehicle body that is supported by the springs of the vehicle, controls the braking/driving force generating mechanism to cause the wheels to respectively generate driving forces or braking forces independently of one another. The braking/driving force control system includes: detecting a driver's operating state for causing the vehicle to run; detecting a motional state of the vehicle body while the vehicle is running; computing a target longitudinal driving force for causing the vehicle to run and a plurality of target motional state amounts for controlling behaviors of the vehicle body on the basis of the detected operating state and the detected motional state; and computing driving forces or braking forces that are respectively allocated to the wheels so as to achieve the computed target longitudinal driving force and the plurality of computed target motional state amounts and that the braking/driving force generating mechanism causes the wheels to respectively generate independently of one another.

According to the above aspects, the input unit is able to input the driver's operating state detected by the operating state detecting unit and the motional state of the vehicle body, detected by the motional state detecting unit, and the vehicle body behavior control value computing unit is able to compute the target longitudinal driving force and the plurality of target motional state amounts (for example, the target roll moment, the target pitch moment, the target yaw moment, and the like) on the basis of at least the detected operating state and motional state. In addition, the driving force allocation computing unit is able to compute driving forces or braking forces that are allocated so as to achieve the target longitudinal driving force and the plurality of target motional state amounts computed by the vehicle body behavior control value computing unit at the same time and that the wheels (more specifically, the left and right front wheels and the left and right rear wheels) are cause to respectively generate. Here, when driving forces or braking forces that the wheels (more specifically, the left and right front wheels and the left and right rear wheels) are caused to respectively generate are allocated and computed, it is possible to compute the driving forces or braking forces on the basis of arrangement of the wheels and suspension mechanisms of the vehicle using a geometrically determined allocation. Furthermore, the torque computing unit is able to compute driving torques or braking torques that are generated by the braking/driving force generating mechanism (electric motors) in correspondence with the driving forces or braking forces that are computed by the driving force allocation computing unit and that the wheels are caused to respectively generate.

By so doing, the braking/driving force generation mechanism causes the wheels to respectively generate driving forces or braking forces (driving torques or braking torques). Therefore, it is possible to appropriately cause the vehicle to run, and it is possible to control, for example, the roll behavior, pitch behavior and yaw behavior of the vehicle body at the same time. By so doing, in comparison with the case where the roll behavior, the pitch behavior and the yaw behavior are controlled independently of one another, it is possible to effectively prevent the influence of controls over the behaviors on one another, and it is possible to favorably ensure a ride comfort by appropriately causing the vehicle to run while suppressing a variation in the behaviors of the vehicle body.

In addition, when any one of the driving forces or braking forces computed by the driving force allocation computing unit exceeds a maximum driving force or a maximum braking force, the gain computing unit is able to compute a gain by which the driving forces or braking forces for achieving the plurality of target motional state amounts computed by the vehicle body behavior control value computing unit are reduced. In this case, specifically, the gain computing unit is able to compute the gain in such a manner that values (behavior control driving forces) obtained by subtracting driving forces (or braking forces) for achieving the target longitudinal driving force computed by the vehicle body behavior control value computing unit within the driving forces (or braking forces) allocated and computed by the driving force allocation computing unit from the maximum driving force (or the maximum braking force) are divided by the driving forces (or braking forces) for achieving the plurality of target motional state amounts. Then, in this case, the maximum driving force and the maximum braking force may be determined on the basis of the ground contact state of the wheels.

According to the above aspects, even when any one of the driving forces or braking forces computed by the driving force allocation computing unit exceeds the maximum driving force or the maximum braking force, the plurality of target motional state amounts (for example, the roll behavior, pitch behavior and yaw behavior) of the vehicle body may be controlled at the same time without varying the target longitudinal driving force for causing the vehicle to run. Thus, it is possible to appropriately control the behaviors of the vehicle body to thereby make it possible to ensure a ride comfort, and it is possible to prevent a variation in vehicle speed (acceleration in the longitudinal direction) resulting from control over the behaviors of the vehicle body, so it is possible to effectively prevent the driver from experiencing a feeling of strangeness. In addition, by determining the maximum driving force and the maximum braking force on the basis of the ground contact state of the wheels, it is possible to determine whether any one of driving forces or braking forces computed by the driving force allocation computing unit in response to a running environment of the vehicle exceeds the maximum driving force or the maximum braking force, and, as a result, it is possible to further appropriately control the behaviors of the vehicle body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS a. First Embodiment

Figure 1:
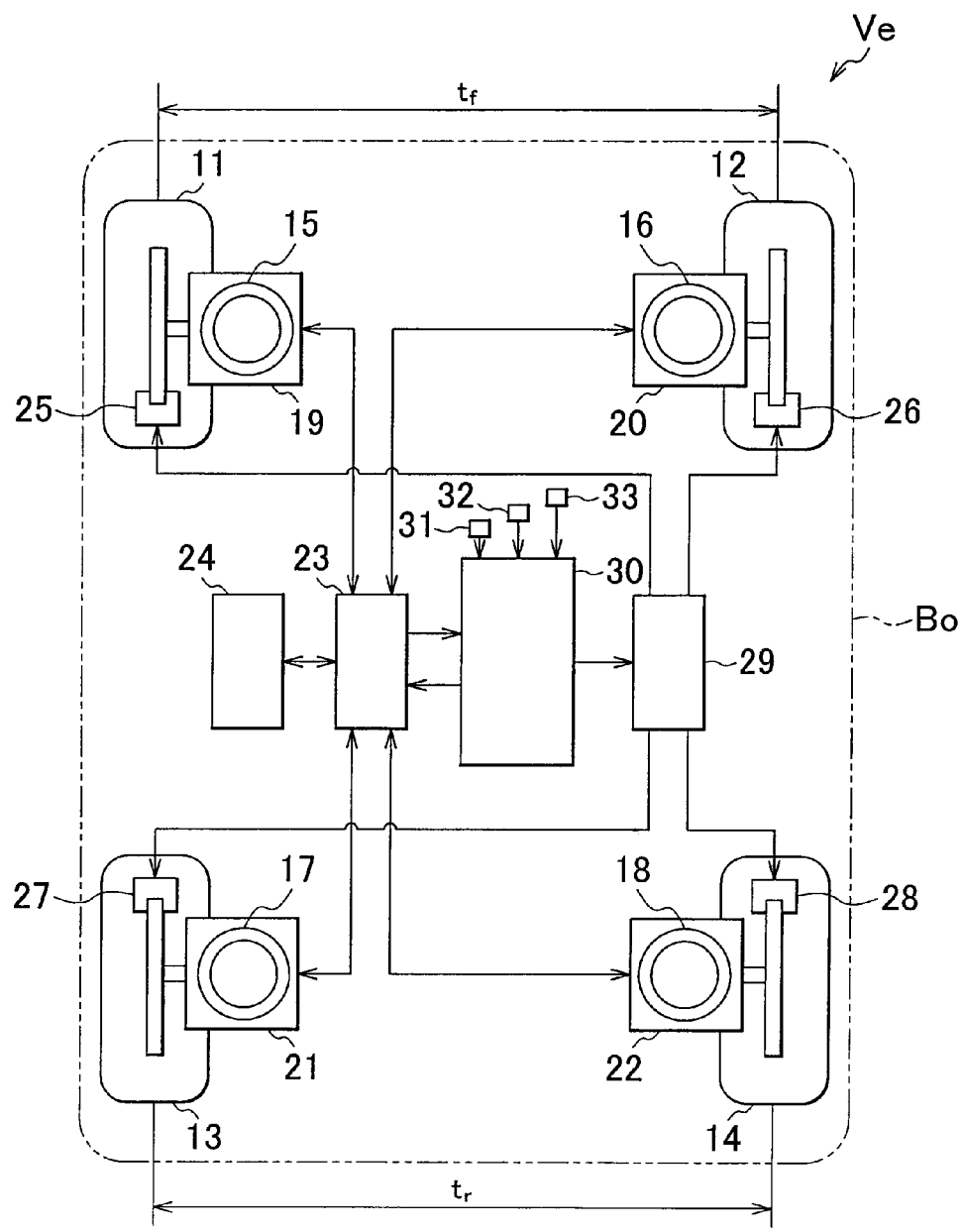
FIG. 1 is a schematic view that schematically shows the configuration of a vehicle to which a vehicle braking/driving force control system according to the aspect of the invention may be applied.

Hereinafter, an embodiment of the invention will be described in detail with reference to the accompanying drawings. FIG. 1 schematically shows the configuration of a vehicle Ve equipped with a vehicle braking/driving force control system according to embodiments.

The vehicle Ve includes left and right front wheels 11 and 12 and left and right rear wheels 13 and 14. Then, the left and right front wheels 11 and 12 are supported by a vehicle body Bo of the vehicle Ve via respective suspension mechanisms 15 and 16 independently of each other. That is, the vehicle body Bo is supported by the springs (supported by the suspension mechanisms). In addition, the left and right rear wheels 13 and 14 are supported together by the vehicle body Bo of the vehicle Ve via respective suspension mechanisms 17 and 18. Or the left and right rear wheels 13 and 14 are supported by the vehicle body Bo of the vehicle Ve via respective suspension mechanisms 17 and 18 independently of each other.

Here, the configuration of each of the suspension mechanisms 15 to 18 is not directly linked with the aspect of the invention, so the detailed description thereof is omitted; however, for example, a known suspension, such as a strut type suspension formed of a strut that incorporates a shock absorber, a coil spring, a suspension arm, and the like, and a wishbone type suspension formed of a coil spring, a shock absorber, upper and lower suspension arms, and the like, may be employed.

Electric motors 19 and 20 are respectively assembled inside the left and right front wheels 11 and 12. In addition, electric motors 21 and 22 are respectively assembled inside the left and right rear wheels 13 and 14. The electric motors 19 and 20 are respectively coupled to the left and right front wheels 11 and 12 so that power is transmittable. The electric motors 21 and 22 are respectively coupled to the left and right rear wheels 13 and 14 so that power is transmittable. That is, the electric motors 19 to 22 are so-called in-wheel motors 19 to 22. The electric motors 19 to 22 together with the left and right front wheels 11 and 12 and the left and right rear wheels 13 and 14 are not supported by the springs of the vehicle Ve. Then, by controlling the rotation of each of the in-wheel motors 19 to 22 independently of one another, driving forces or braking forces that the left and right front wheels 11 and 12 and the left and right rear wheels 13 and 14 are caused to respectively generate may be controlled independently of one another.

Each of these in-wheel motors 19 to 22 is, for example, formed of an alternating-current synchronous motor. Direct-current electric power from an electrical storage device 24, such as a battery and a capacitor, is converted to alternating-current electric power via an inverter 23, and the alternating-current electric power is supplied to each of the in-wheel motors 19 to 22. By so doing, each of the in-wheel motors 19 to 22 is driven (that is, power running), and driving torque is applied to a corresponding one of the left and right front wheels 11 and 12 and the left and right rear wheels 13 and 14. In addition, each of the in-wheel motors 19 to 22 is able to utilize the rotational energy of a corresponding one of the left and right front wheels 11 and 12 and the left and right rear wheels 13 and 14 to execute regenerative control. That is, during regeneration or power generation of each of the in-wheel motors 19 to 22, the rotational (kinetic) energy of a corresponding one of the left and right front wheels 11 and 12 and the left and right rear wheels 13 and 14 is converted to electrical energy by each of the in-wheel motors 19 to 22 and then the generated electric power is stored in the electrical storage device 24 via the inverter 23. At this time, braking torque based on regeneration/power generation capacity is applied to a corresponding one of the left and right front wheels 11 and 12 and the left and right rear wheels 13 and 14. Thus, the in-wheel motors 19 to 22, the inverter 23 and the electrical storage device 24 constitute the braking/driving force generating mechanism according to the aspect of the invention.

In addition, brake mechanisms 25, 26, 27 and 28 are respectively provided between the wheels 11 to 14 and the corresponding in-wheel motors 19 to 22. Each of the brake mechanisms 25 to 28 is, for example, a known braking device, such as a disc brake and a drum brake. Then, each of these brake mechanisms 25 to 28 is, for example, connected to a brake actuator 29. The brake actuator 29 actuates pistons of brake calipers and brake shoes (both are not shown) that cause the wheels 11 to 14 to respectively generate braking forces by hydraulic pressure pumped from a master cylinder (not shown).

The inverter 23 and the brake actuator 29 each are connected to an electronic control unit 30. The electronic control unit 30 controls the rotational state of each of the in-wheel motors 19 to 22, the operating state of each of the brake mechanisms 25 to 28, and the like. Thus, the electronic control unit 30 constitutes the control unit according to the aspect of the invention.

The electronic control unit 30 includes a microcomputer formed of a CPU, a ROM, a RAM, and the like, as major components, and executes various programs. Therefore, signals from various sensors and signals from the inverter 23 are input to the electronic control unit 30. The various sensors include an operating state detecting sensor 31, a motional state detecting sensor 32 and a disturbance detecting sensor 33. The operating state detecting sensor 31 serves as an operating state detecting unit and detects the driver's operating state for causing the vehicle Ve to run. The motional state detecting sensor 32 serves as a motional state detecting unit and detects the motional state of the vehicle body Bo (sprung mass) arranged on springs, that is, on suspension mechanisms of the running vehicle Ve. The disturbance detecting sensor 33 detects a disturbance applied to the running vehicle Ve.

Here, the operating state detecting sensor 31 is, for example, formed of a steering angle sensor, an accelerator sensor, a throttle sensor, a brake sensor, and the like. The steering angle sensor detects a driver's operation amount (steering angle) of a steering wheel (not shown). The accelerator sensor detects a driver's operation amount (depression amount, angle, pressure, and the like) of an accelerator pedal (not shown). The throttle sensor detects the opening degree of a throttle that is provided for an engine (not shown) and that operates in response to an operation of the accelerator pedal. The brake sensor detects a driver's operation amount (depression amount, angle, pressure, and the like) of a brake pedal (not shown). In addition, the motional state detecting sensor 32 is, for example, formed of a sprung mass vertical acceleration sensor, a lateral acceleration sensor, a vehicle speed sensor, a yaw rate sensor, a pitch rate sensor, a roll rate sensor, and the like. The sprung mass acceleration sensor detects the vertical acceleration of the vehicle body Bo (sprung mass) in the vertical direction. The lateral acceleration sensor detects the lateral acceleration of the vehicle body Bo in the transverse direction. The vehicle speed sensor detects the vehicle speed of the vehicle body Bo (vehicle Ve). The yaw rate sensor detects the yaw rate of the vehicle body Bo (vehicle Ve). The pitch rate sensor detects the pitch rate of the vehicle body Bo (vehicle Ve). The roll rate sensor detects the roll rate of the vehicle body Bo (vehicle Ve). Furthermore, the disturbance detecting sensor 33 is, for example, formed of a stroke sensor, an unsprung mass vertical acceleration sensor, and the like. The stroke sensor detects the stroke amount of each of the suspension mechanisms 15 to 18. The unsprung mass vertical acceleration sensor detects the vertical acceleration of the unsprung mass, including the wheels 11 to 14, of the vehicle Ve in the vertical direction.

In this way, because the sensors 31 to 33 and the inverter 23 are connected to the electronic control unit 30 and signals are input to the electronic control unit 30, the electronic control unit 30 is able to acquire and control the running condition of the vehicle Ve and the behaviors of the vehicle body Bo.

Control over the running condition of the vehicle Ve will be specifically described first. The electronic control unit 30 is able to, for example, compute a required driving force corresponding to an accelerator operation amount when the driver is operating the accelerator pedal, that is, a driving force that should be generated by the in-wheel motors 19 to 22 in order to cause the vehicle Ve to run, on the basis of the signal input from the operating state detecting sensor 31. In addition, the electronic control unit 30 is able to, for example, compute a required braking force corresponding to a brake operation amount when the driver is operating the brake pedal, that is, a braking force that should be generated by coordination between the in-wheel motors 19 to 22 and the brake mechanisms 25 to 28 in order to decelerate the vehicle Ve on the basis of the signal input from the operating state detecting sensor 31. Then, the electronic control unit 30 causes the in-wheel motors 19 to 22 to generate an output torque (motor torque) corresponding to the required driving force or causes the in-wheel motors 19 to 22 to generate an output torque (motor torque) corresponding to the required braking force on the basis of the signal input from the inverter 23, specifically, signals that indicate the amounts of electric power and current values respectively supplied to the in-wheel motors 19 to 22 during power running control or signals that indicate the amounts of electric power and current values respectively regenerated from the in-wheel motors 19 to 22 during regenerative control.

By so doing, the electronic control unit 30 is able to output signals for executing power running control or regenerative control over the rotations of the in-wheel motors 19 to 22 via the inverter 23 and to output signals for controlling the operations of the brake mechanisms 25 to 28 via the brake actuator 29. Thus, the electronic control unit 30 at least obtains a required driving force or a required braking force required of the vehicle Ve on the basis of the signal input from the operating state detecting sensor 31, and then outputs signals for controlling the power running/regenerative states of the in-wheel motors 19 to 22 and the operations of the brake actuator 29, that is, the brake mechanisms 25 to 28, so as to generate the required driving force or the required braking force to thereby make it possible to control the running condition of the vehicle Ve.

On the other hand, the electronic control unit 30 is able to control the behaviors of the vehicle body Bo (sprung mass) on the basis of the signals input from the operating state detecting sensor 31, the motional state detecting sensor 32 and the disturbance detecting sensor 33. Hereinafter, control over the behaviors of the vehicle body Bo will be described in detail.

Figure 2:
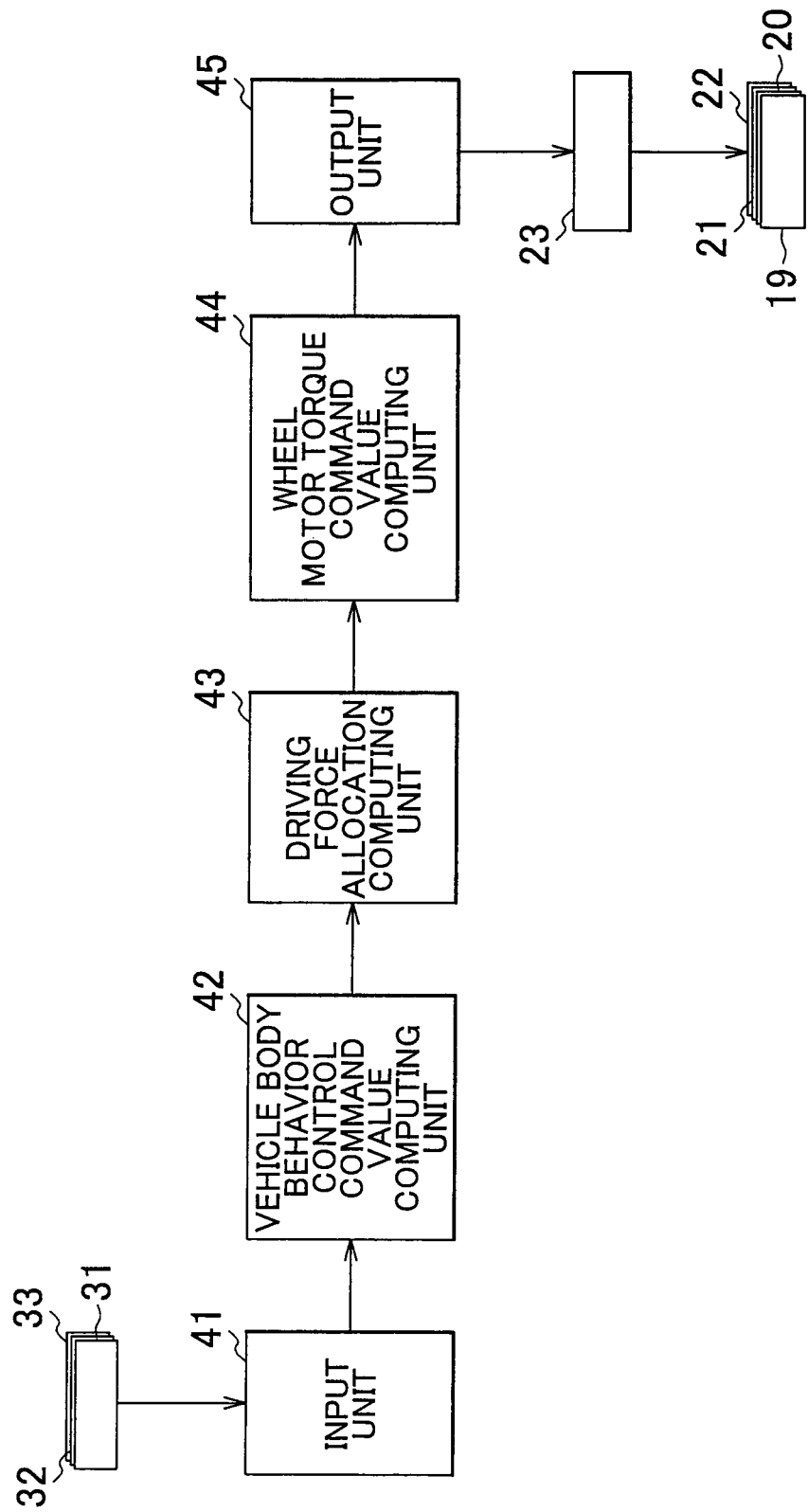
FIG. 2 is a functional block diagram that functionally shows computer program processing of braking/driving force control executed by an electronic control unit shown in FIG. 1 according to a first embodiment of the invention.

The electronic control unit 30 according to the first embodiment appropriately controls the allocation of driving forces (or braking forces) that the in-wheel motors 19 to 22 respectively generate to thereby cause the vehicle Ve to run, and controls the roll behavior, the pitch behavior and the yaw behavior as the behaviors of the vehicle body Bo (sprung mass). Therefore, as shown in FIG. 2, the electronic control unit 30 includes an input unit 41, a vehicle body behavior control command value computing unit 42, a driving force allocation computing unit 43, a wheel motor torque command value computing unit 44 and an output unit 45. The vehicle body behavior control command value computing unit 42 serves as a vehicle body behavior control value computing unit. The wheel motor torque command value computing unit 44 serves as a torque computing unit.

Signals are input from the operating state detecting sensor 31, the motional state detecting sensor 32 and the disturbance detecting sensor 33 to the input unit 41. Then, the input unit 41, for example, acquires the steering angle of the steering wheel operated by the driver, the accelerator operation amount and the throttle opening degree resulting from an operation of the accelerator pedal, the brake operation amount resulting from an operation of the brake pedal, and the like, on the basis of the signal input from the operating state detecting sensor 31. In addition, the input unit 41, for example, acquires the vehicle speed of the vehicle body Bo (vehicle Ve), the roll rate, pitch rate and yaw rate of the vehicle body Bo, and the like, on the basis of the signal input from the motional state detecting sensor 32. Furthermore, the input unit 41, for example, acquires the degree of unevenness of a road surface on which the vehicle Ve is running, the degree of influence of cross wind on the vehicle Ve, and the like, on the basis of the signal input from the disturbance detecting sensor 33. In this way, when the input unit 41 acquires various detected values, the input unit 41 outputs the acquired various detected values to the vehicle body behavior control command value computing unit 42.

The vehicle body behavior control command value computing unit 42 uses the various detected values input from the input unit 41 to compute a target longitudinal driving force $F_X$ as a control command value for causing the vehicle Ve to run, and computes control command values for controlling the behaviors of the vehicle body Bo, that is, a target roll moment $M_x$, a target pitch moment $M_y$ and a target yaw moment $M_z$ as a plurality of target motional state amounts. Note that a known computing method may be employed to compute the target longitudinal driving force $F_X$, the target roll moment $M_x$, the target pitch moment $M_y$ and the target yaw moment $M_z$, so the described description thereof is omitted; however, the computation will be simply described below.

First, for the target longitudinal driving force $F_X$ that the in-wheel motors 19 to 22 generate to cause the vehicle Ve to run, the vehicle body behavior control command value computing unit 42, for example, uses detected values, such as the accelerator operation amount, the throttle opening degree, the brake operation amount and the vehicle speed, input from the input unit 41, to compute the target longitudinal driving force $F_X$ that is in a predetermined correlation with these detected values. For the target roll moment $M_x$, the vehicle body behavior control command value computing unit 42, for example, uses the detected values, such as the steering angle, the vehicle speed, the roll rate, the degree of unevenness of a road surface and the degree of influence of cross wind, input from the input unit 41, to compute the target roll moment $M_x$ that is in a predetermined correlation with these detected values. For the target pitch moment $M_y$, the vehicle body behavior control command value computing unit 42, for example, uses the detected values, such as the accelerator operation amount, the throttle opening degree, the brake operation amount, the vehicle speed, the pitch rate and the degree of unevenness of a road surface, input from the input unit 41, to compute the target pitch moment $M_y$ that is in a predetermined correlation with these detected values. For the target yaw moment $M_z$, the vehicle body behavior control command value computing unit 42, for example, uses the detected values, such as the steering angle, the vehicle speed, the yaw rate and the degree of influence of cross wind, input from the input unit 41, to compute the target yaw moment $M_z$ that is in a predetermined correlation with these detected values.

In this way, when the vehicle body behavior control command value computing unit 42 computes the target longitudinal driving force $F_X$, the target roll moment $M_x$, the target pitch moment $M_y$ and the target yaw moment $M_z$, the vehicle body behavior control command value computing unit 42 outputs command values that respectively indicate the computed target longitudinal driving force $F_X$, target roll moment $M_x$, target pitch moment $M_y$ and target yaw moment $M_z$ to the driving force allocation computing unit 43.

The driving force allocation computing unit 43 computes driving forces that are respectively allocated to and generated by the wheels 11 to 14 in order to generate the target longitudinal driving force $F_X$ indicated by the command value output from the vehicle body behavior control command value computing unit 42. In addition, the driving force allocation computing unit 43 computes driving forces that are respectively allocated to and generated by the wheels 11 to 14 in order to generate the target roll moment $M_x$, target pitch moment $M_y$ and target yaw moment $M_z$, indicated by the command values output from the vehicle body behavior control command value computing unit 42, at the position of the barycenter of the vehicle Ve. That is, the driving force allocation computing unit 43 computes a front left driving force $F_{fl}$ for the left front wheel 11, a front right driving force $F_{fr}$ for the right front wheel 12, a rear left driving force $F_{rl}$ for the left rear wheel 13 and a rear right driving force $F_{rr}$ for the right rear wheel 14 in accordance with the following mathematical expression (1) that uses the target longitudinal driving force $F_X$, the target roll moment $M_x$, the target pitch moment $M_y$ and the target yaw moment $M_z$.

[Mathematical Expression (1)]

$$\begin{bmatrix} F_{fl} \\ F_{fr} \\ F_{rl} \\ F_{rr} \end{bmatrix} = \begin{bmatrix} 1 & 1 & 1 & 1 \\ -a_1 & a_1 & a_2 & -a_2 \\ a_3 & a_3 & a_4 & a_4 \\ -a_5 & a_5 & -a_6 & a_6 \end{bmatrix}^{-1} \cdot \begin{bmatrix} F_X \\ M_x \\ M_y \\ M_z \end{bmatrix} \quad (1)$$

In the mathematical expression (1), $a_1$, $a_2$, $a_3$, $a_4$, $a_5$ and $a_6$ are determined on the basis of the geometrical arrangement of the wheels 11 to 14 and suspension mechanisms 15 to 18 of the vehicle Ve, and are expressed by the following mathematical expression (2).

[Mathematical Expression (2)]

$$a_1 = \frac{t_f}{2}\tan\theta_f,\ a_2 = \frac{t_r}{2}\tan\theta_r,\ a_3 = L_f\tan\theta_f,\ a_4 = L_r\tan\theta_r, \quad (2)$$

$$a_5 = \frac{t_f}{2},\ a_6 = \frac{t_r}{2}$$

Figure 3:
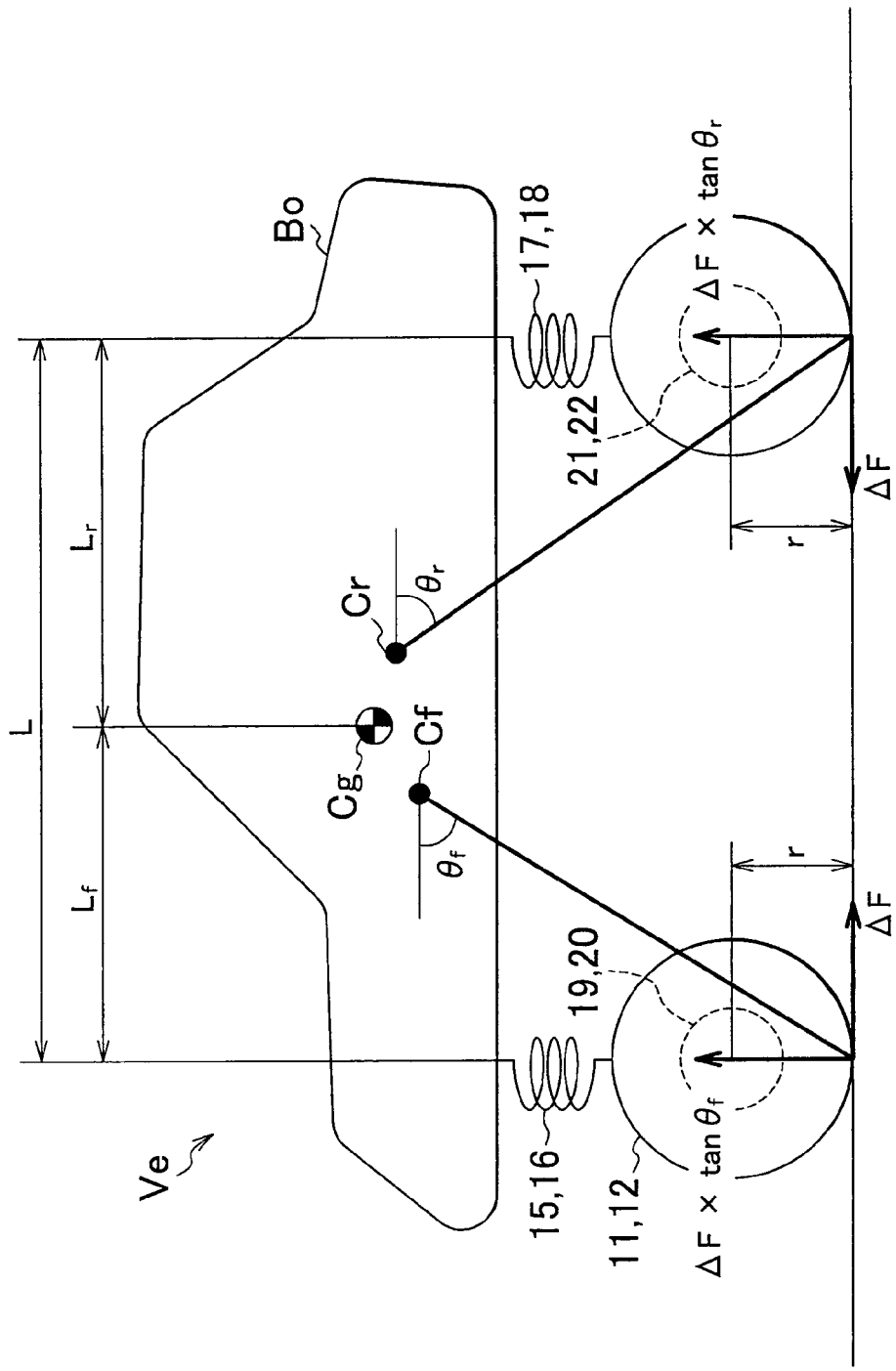
FIG. 3 is a view for illustrating force input to a vehicle body when a difference in driving force in a longitudinal direction occurs in the vehicle shown in FIG. 1.

Here, the mathematical expression (1) and the mathematical expression (2) will be specifically described with reference to FIG. 1 and FIG. 3. Now, as is schematically shown in FIG. 3, as the geometrical arrangement of the wheels 11 to 14 and suspension mechanisms 15 to 18 of the vehicle Ve, the distance between the barycenter Cg of the vehicle Ve and the axles of the left and right front wheels 11 and 12 is denoted by $L_f$ and the distance between the barycenter Cg of the vehicle Ve and the axles of the left and right rear wheels 13 and 14 is denoted by $L_r$ with respect to a wheel base L, and, as shown in FIG. 1, the tread width between the left and right front wheels 11 and 12 is denoted by $t_f$ and the tread width between the left and right rear wheels 13 and 14 is denoted by $t_r$. In addition, in the vehicle Ve having such geometrical arrangement, the angle between the horizontal line and the line that connects the rotation center Cf of each of the suspension mechanisms 15 and 16 of the left and right front wheels 11 and 12 to the ground contact point of each of the left and right front wheels 11 and 12 is denoted by $\theta_f$ (hereinafter, referred to as instantaneous rotation angle $\theta_f$), and the angle between the horizontal line and the line that connects the rotation center Cr of each of the suspension mechanisms 17 and 18 of the left and right rear wheels 13 and 14 to the ground contact point of each of the left and right front wheels 13 and 14 is denoted by $\theta_r$ (hereinafter, referred to as instantaneous rotation angle $\theta_r$).

In this case, for example, as shown in FIG. 3, when there occurs a driving force difference $\Delta F$ in the longitudinal direction between the left and right front wheels 11 and 12 and the left and right rear wheels 13 and 14, there occur vertical forces that act in the vertical direction as the component forces of the driving force difference $\Delta F$, that is, the reaction forces of the suspension mechanisms 15 to 18. Note that FIG. 3, for example, shows the case where driving forces that the left and right rear wheels 13 and 14 respectively generate are larger than driving forces that the left and right front wheels 11 and 12 respectively generate, and shows a situation that, as a result, the driving force difference ΔF that occurs in the left and right front wheels 11 and 12 relatively occurs as a braking force that acts on the rear of the vehicle Ve, and the driving force difference ΔF that occurs in the left and right rear wheels 13 and 14 relatively occurs as a driving force that acts on the front of the vehicle Ve. Thus, on the contrary, when driving forces that the left and right front wheels 11 and 12 respectively generate are larger than driving forces that the left and right rear wheels 13 and 14 respectively generate, the driving force difference ΔF that occurs in the left and right front wheels 11 and 12 relatively occurs as a driving force that acts on the rear of the vehicle Ve, and the driving force difference ΔF that occurs in the left and right rear wheels 13 and 14 relatively occurs as a braking force that acts on the front of the vehicle Ve.

Then, the vertical force that occurs in this way may be expressed by $\Delta F \times \tan\theta_f$ using the instantaneous rotation angle $\theta_f$ of each of the suspension mechanisms 15 and 16 for the left and right front wheels 11 and 12, and may be expressed by $\Delta F \times \tan\theta_r$ using the instantaneous rotation angle $\theta_r$ of each of the suspension mechanisms 17 and 18 for the left and right rear wheels 13 and 14. Thus, when the driving force difference ΔF is generated in each of the wheels 11 to 14 in this way and then the vertical forces $\Delta F \times \tan\theta_f$ and the vertical forces $\Delta F \times \tan\theta_r$ that are input to the vehicle body Bo are caused to act around the barycenter Cg of the vehicle Ve, acting force generated around the barycenter Cg is geometrically determined on the basis of the above described arrangement of the wheels 11 to 14 and suspension mechanisms 15 to 18 of the vehicle Ve in accordance with the mathematical expression (2).

Then, by using the acting force determined in accordance with the mathematical expression (2) based on the geometrical arrangement in this way, the computed target roll moment $M_x$, target pitch moment $M_y$ and target yaw moment $M_z$ may be generated around the barycenter Cg of the vehicle Ve with respect to the vehicle body Bo. Thus, by computing the front left driving force $F_{fl}$ for the left front wheel 11, the front right driving force $F_{fr}$ for the right front wheel 12, the rear left driving force $F_{rl}$ for the left rear wheel 13 and the rear right driving force $F_{rr}$ for the right rear wheel 14 on the basis of the mathematical expression (1) and the mathematical expression (2), the computed target roll moment $M_x$, target pitch moment $M_y$ and target yaw moment $M_z$ may be generated around the barycenter Cg at the same time to thereby control the behaviors of the vehicle body Bo. In this way, when the front left driving force $F_{fl}$ for the left front wheel 11, the front right driving force $F_{fr}$ for the right front wheel 12, the rear left driving force $F_{rl}$ for the left rear wheel 13 and the rear right driving force $F_{rr}$ for the right rear wheel 14 are computed in accordance with the mathematical expression (1) and the mathematical expression (2), the driving force allocation computing unit 43 outputs the front left driving force $F_{fl}$, the front right driving force $F_{fr}$, the rear left driving force $F_{rl}$ and the rear right driving force $F_{rr}$ to the wheel motor torque command value computing unit 44.

The wheel motor torque command value computing unit 44 computes motor torques that should be respectively generated by the in-wheel motors 19 to 22 in correspondence with the front left driving force $F_{fl}$, front right driving force $F_{fr}$, rear left driving force $F_{rl}$ and rear right driving force $F_{rr}$ computed by the driving force allocation computing unit 43. That is, the wheel motor torque command value computing unit 44 computes a motor torque $T_{fl}$ that the in-wheel motor 19 generates in correspondence with the front left driving force $F_{fl}$, a motor torque $T_{fr}$ that the in-wheel motor 20 generates in correspondence with the front right driving force $F_{fr}$, a motor torque $T_{rl}$ that the in-wheel motor 21 generates in correspondence with the rear left driving force $F_{rl}$ and a motor torque $T_{rr}$ that the in-wheel motor 22 generates in correspondence with the rear left driving force $F_{rr}$ in accordance with the following mathematical expression (3).

[Mathematical Expression (3)]

$$\begin{bmatrix} T_{fl} \\ T_{fr} \\ T_{rl} \\ T_{rr} \end{bmatrix} = r \cdot \begin{bmatrix} 1 & 1 & 1 & 1 \\ -a_1 & a_1 & a_2 & -a_2 \\ a_3 & a_3 & a_4 & a_4 \\ -a_5 & a_5 & -a_6 & a_6 \end{bmatrix}^{-1} \cdot \begin{bmatrix} F_X \\ M_x \\ M_y \\ M_z \end{bmatrix} \quad (3)$$

In the mathematical expression (3), r denotes the tire radius (or the gear ratio of the reduction mechanism (not shown)) of each of the wheels 11 to 14 as shown in FIG. 3. Then, the wheel motor torque command value computing unit 44 outputs the computed motor torques $T_{fl}$, $T_{fr}$, $T_{rl}$ and $T_{rr}$ to the output unit 45.

The output unit 45 outputs driving signals corresponding to the motor torques $T_{fl}$, $T_{fr}$, $T_{rl}$ and $T_{rr}$ computed by the wheel motor torque command value computing unit 44 to the inverter 23. By so doing, the inverter 23 controls driving electric powers (driving currents) supplied respectively to the in-wheel motors 19 to 22 to drive the in-wheel motors 19 to 22. By so doing, the front left driving force $F_{fl}$, front right driving force $F_{fr}$, rear left driving force $F_{rl}$ and rear right driving force $F_{rr}$ computed by the driving force allocation computing unit 43 are respectively generated by the wheels 11 to 14. As a result, the vehicle Ve may be appropriately caused to run in response to a driver's operating state, and the behaviors of the vehicle body Bo, that is, the roll behavior, the pitch behavior and the yaw behavior, may be controlled at the same time.

As can be understood from the above description, according to the first embodiment, the vehicle body behavior control command value computing unit 42 is able to compute the target longitudinal driving force $F_X$, the target roll moment $M_x$, the target pitch moment $M_y$ and the target yaw moment $M_z$ on the basis of various detected values input from the input unit 41. In addition, the driving force allocation computing unit 43 computes driving forces that the wheels 11 to 14 are caused to respectively generate, specifically, the front left driving force $F_{fl}$, the front right driving force $F_{fr}$, the rear left driving force $F_{rl}$ and the rear right driving force $F_{rr}$, so as to achieve the target longitudinal driving force $F_X$, the target roll moment $M_x$, the target pitch moment $M_y$ and the target yaw moment $M_z$ at the same time. The wheel motor torque command value computing unit 44 is able to compute motor torques $T_{fl}$, $T_{fr}$, $T_{rl}$ and $T_{rr}$ to be generated by the in-wheel motors 19 to 22 provided for the wheels 11 to 14 in correspondence with the front left driving force $F_{fl}$, the front right driving force $F_{fr}$, the rear left driving force $F_{rl}$ and the rear right driving force $F_{rr}$.

Then, the in-wheel motors 19 to 22 respectively generate the motor torques $T_{fl}$, $T_{fr}$, $T_{rl}$ and $T_{rr}$ corresponding to the front left driving force $F_{fl}$, the front right driving force $F_{fr}$, the rear left driving force $F_{rl}$ and the rear right driving force $F_{rr}$. By so doing, it is possible to appropriately cause the vehicle Ve to run and to control the roll behavior, pitch behavior and yaw behavior of the vehicle body Bo at the same time. By so doing, in comparison with the case where the roll behavior, the pitch behavior and the yaw behavior are controlled independently of one another, it is possible to effectively prevent the influence of controls over the behaviors on one another, and it is possible to favorably ensure a ride comfort while suppressing a variation in the behaviors of the vehicle body Bo.

b. Second Embodiment

Next, a second embodiment of the invention will be described. In the first embodiment, in order to generate the target longitudinal driving force $F_X$, target roll moment $M_x$, target pitch moment $M_y$ and target yaw moment $M_z$ computed by the vehicle body behavior control command value computing unit 42, the driving force allocation computing unit 43 computes the front left driving force $F_{fl}$, the front right driving force $F_{fr}$, the rear left driving force $F_{rl}$ and the rear right driving force $F_{rr}$, and the wheel motor torque command value computing unit 44 computes the motor torques $T_{fl}$, $T_{fr}$, $T_{rl}$ and $T_{rr}$. Then, in the first embodiment, the in-wheel motors 19 to 22 respectively generate the computed motor torques $T_{fl}$, $T_{fr}$, $T_{rl}$ and $T_{rr}$.

In this case, when a plurality of behaviors of the vehicle body Bo are controlled, for example, a driving force (or a braking force) in any one of the wheels 11 to 14, that is, a motor torque required of any one of the in-wheel motors 19 to 22, may exceed a preset upper limit of generatable torque or may exceed a ground contact state of the wheels 11 to 14, specifically, a limit made by a tire friction circle, or the like. In this case, when the entire driving force (motor torque) is simply limited by a percentage at which a driving force (or a braking force) that should be generated or a required motor torque exceeds the above described upper limit or limit, for example, it may be difficult to keep (control) the vehicle speed because of a variation in the longitudinal acceleration of the vehicle Ve. Therefore, in the second embodiment, without varying components associated with the target longitudinal driving force $F_X$ for appropriately causing the vehicle Ve to run within the front left driving force $F_{fl}$, front right driving force $F_{fr}$, rear left driving force $F_{rl}$ and rear right driving force $F_{rr}$ computed by the driving force allocation computing unit 43 (that is, without varying the target longitudinal driving force $F_X$), only components associated with the target roll moment $M_x$, the target pitch moment $M_y$ and the target yaw moment $M_z$ for controlling a plurality of behaviors of the vehicle body Bo are reduced. Hereinafter, the second embodiment will be described in detail; however, like reference numerals denote similar components to those of the first embodiment, and the description thereof is omitted.

Figure 4:
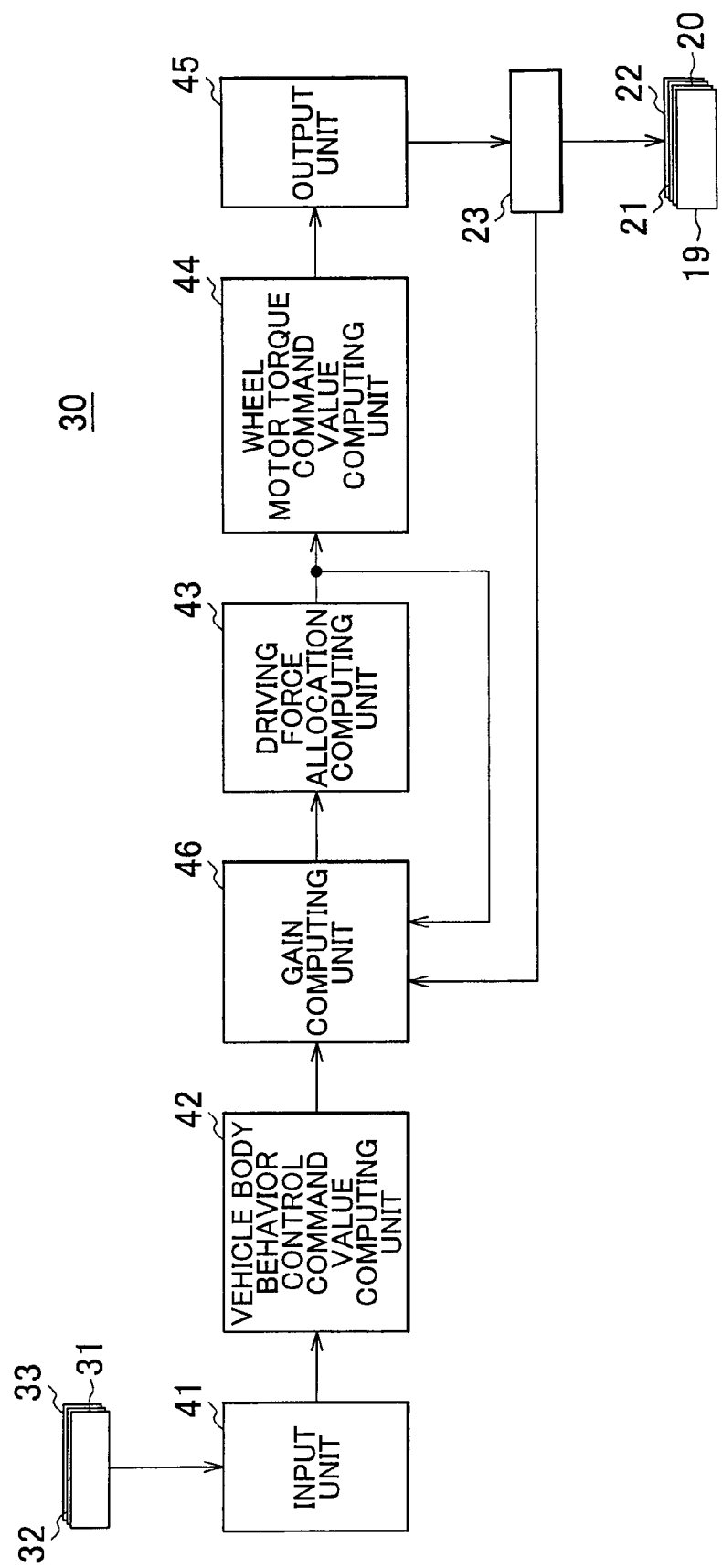
FIG. 4 is a functional block diagram that functionally shows computer program processing of turning control executed by the electronic control unit shown in FIG. 1 according to a second embodiment of the invention.

The second embodiment shown in FIG. 4 differs from the first embodiment shown in FIG. 2 in that a gain computing unit 46 is provided. When any one of the front left driving force $F_{fl}$, front right driving force $F_{fr}$, rear left driving force $F_{rl}$ and rear right driving force $F_{rr}$ computed by the driving force allocation computing unit 43 exceeds a driving force $F_{limit}$ that is a maximum driving force (or maximum braking force) that each of the in-wheel motors 19 to 22 is able to generate in a corresponding one of the wheels 11 to 14, the gain computing unit 46 computes a gain K by which the components of the front left driving force $F_{fl}$, front right driving force $F_{fr}$, rear left driving force $F_{rl}$ and rear right driving force $F_{rr}$ associated with the target roll moment $M_x$, target pitch moment $M_y$ and target yaw moment $M_z$ computed by the vehicle body behavior control command value computing unit 42 are reduced. Hereinafter, the gain computing unit 46 will be described in detail.

As described above, the gain computing unit 46 computes and determines a gain K in such a manner that only components associated with control over the target roll moment $M_x$, the target pitch moment $M_y$ and the target yaw moment $M_z$ within the components of the front left driving force $F_{fl}$, front right driving force $F_{fr}$, rear left driving force $F_{rl}$ and rear right driving force $F_{rr}$ computed by the driving force allocation computing unit 43 are reduced without varying the target longitudinal driving force $F_X$. Here, as is apparent from the mathematical expression (1), the target longitudinal driving force $F_X$ is the resultant force of the front left driving force $F_{fl}$, the front right driving force $F_{fr}$, the rear left driving force $F_{rl}$ and the rear right driving force $F_{rr}$ generated by the wheels 11 to 14, so, for the sake of convenience, an average driving force $F_{Xi}$ per one wheel may be $F_X/4$ that is obtained by dividing the target longitudinal driving force $F_X$ by 4.

Thus, the driving force of each of the wheels 11 to 14, which may be used in control over the target roll moment $M_x$, the target pitch moment $M_y$ and the target yaw moment $M_z$ of the vehicle body Bo without varying the target longitudinal driving force $F_X$, is a force obtained by subtracting the average driving force $F_{Xi}$ from the driving force (hereinafter, referred to as behavior control driving force $(F_{limit}-F_{Xi})$) at the maximum. Here, as shown in FIG. 4, the gain computing unit 46 is able to input a signal from the inverter 23, to determine one of the in-wheel motors 19 to 22, which is currently generating the maximum driving force, and to acquire, from the driving force allocation computing unit 43, a driving force $F_c$ that the determined one of the in-wheel motors is generating in order to control the target roll moment $M_x$, the target pitch moment $M_y$ and the target yaw moment $M_z$.

Then, when a value obtained by dividing the behavior control driving force $(F_{limit}-F_{Xi})$ by the driving force $F_c$ is larger than or equal to "1", the driving force $F_c$ that the determined one of the in-wheel motors is generating is smaller than the behavior control driving force $(F_{limit}-F_{Xi})$, that is, the driving force $F_c$ may be generated with an allowance, so the gain computing unit 46 does not compute the gain K (or sets the gain K at "1"). On the other hand, when a value obtained by dividing the behavior control driving force $(F_{limit}-F_{Xi})$ by the driving force $F_c$ is smaller than "1", the driving force $F_c$ that the determined one of the in-wheel motors is generating is larger than the behavior control driving force $(F_{limit}-F_{Xi})$, that is, the driving force $F_c$ may not be generated appropriately. Therefore, the gain computing unit 46 computes the gain K in accordance with the mathematical expression (4) or the mathematical expression (5) in response to the direction of the driving force $F_c$ that the determined one of the in-wheel motors is generating, that is, whether the driving force $F_c$ is a driving force that propels the vehicle Ve forward or a braking force that brakes the vehicle Ve.

[Mathematical Expression 4]

$$K = \frac{(F_{limit} - F_{Xi})}{F_c} \quad (F_c > 0) \qquad (4)$$

[Mathematical Expression 5]

$$K = \frac{(-F_{limit} - F_{Xi})}{F_c} \quad (F_c < 0) \qquad (5)$$

Here, the driving force $F_{limit}$ in the mathematical expression (4) corresponds to the maximum driving force, and the driving force $-F_{limit}$ in the mathematical expression (5) corresponds to the maximum braking force.

In this way, when the gain K is computed and determined in accordance with the mathematical expression (4) or the mathematical expression (5), the gain computing unit 46 multiplies the target roll moment $M_x$, target pitch moment $M_y$ and target yaw moment $M_z$, computed by the vehicle body behavior control command value computing unit 42, by the determined gain K. Then, the gain computing unit 46 outputs the target longitudinal driving force $F_X$ computed by the vehicle body behavior control command value computing unit 42 and the target roll moment $M_x$, target pitch moment $M_y$ and target yaw moment $M_z$ that are multiplied by the gain K to the driving force allocation computing unit 43.

The driving force allocation computing unit 43 computes driving forces that are respectively allocated to and that should be respectively generated by the wheels 11 to 14 in order to generate the target longitudinal driving force $F_X$ indicated by the command value output from the vehicle body behavior control command value computing unit 42 via the gain computing unit 46. In addition, the driving force allocation computing unit 43 computes driving forces that are respectively allocated to and that should be respectively generated by the wheels 11 to 14 in order to generate the target roll moment $KM_x$, target pitch moment $KM_y$ and target yaw moment $KM_z$, indicated by the command values output from the gain computing unit 46, around the barycenter Cg of the vehicle Ve. That is, the driving force allocation computing unit 43 computes a front left driving force $F_{fl}$ for the left front wheel 11, a front right driving force $F_{fr}$ for the right front wheel 12, a rear left driving force $F_{rl}$ for the left rear wheel 13 and a rear right driving force $F_{rr}$ for the right rear wheel 14 in accordance with the following mathematical expression (6) that uses the target longitudinal driving force $F_X$, the target roll moment $KM_x$, the target pitch moment $KM_y$ and the target yaw moment $KM_z$. By so doing, the driving force allocation computing unit 43 is able to reduce only components associated with control over the target roll moment $M_x$, the target pitch moment $M_y$ and the target yaw moment $M_z$ within the components of the front left driving force $F_{fl}$, the front right driving force $F_{fr}$, the rear left driving force $F_{rl}$ and the rear right driving force $F_{rr}$ using the gain K.

[Mathematical Expression 6]

$$\begin{bmatrix} F_{fl} \\ F_{fr} \\ F_{rl} \\ F_{rr} \end{bmatrix} = \begin{bmatrix} 1 & 1 & 1 & 1 \\ -a_1 & a_1 & a_2 & -a_2 \\ a_3 & a_3 & a_4 & a_4 \\ -a_5 & a_5 & -a_6 & a_6 \end{bmatrix}^{-1} \cdot \begin{bmatrix} F_X \\ K \cdot M_x \\ K \cdot M_y \\ K \cdot M_z \end{bmatrix} \quad (6)$$

In this way, when the front left driving force $F_{fl}$ for the left front wheel 11, the front right driving force $F_{fr}$ for the right front wheel 12, the rear left driving force $F_{rl}$ for the left rear wheel 13 and the rear right driving force $F_{rr}$ for the right rear wheel 14 are computed in accordance with the mathematical expression (6), the driving force allocation computing unit 43 outputs the front left driving force $F_{fl}$, the front right driving force $F_{fr}$, the rear left driving force $F_{rl}$ and the rear right driving force $F_{rr}$ to the wheel motor torque command value computing unit 44. As in the case of the first embodiment, the wheel motor torque command value computing unit 44 computes a motor torque $T_{fl}$ that the in-wheel motor 19 generates in correspondence with the front left driving force $F_{fl}$, a motor torque $T_{fr}$ that the in-wheel motor 20 generates in correspondence with the front right driving force $F_{fr}$, a motor torque $T_{rl}$ that the in-wheel motor 21 generates in correspondence with the rear left driving force $F_{rl}$ and a motor torque $T_{rr}$ that the in-wheel motor 22 generates in correspondence with the rear left driving force $F_{rr}$ in accordance with the following mathematical expression (7).

[Mathematical Expression 7]

$$\begin{bmatrix} T_{fl} \\ T_{fr} \\ T_{rl} \\ T_{rr} \end{bmatrix} = r \cdot \begin{bmatrix} 1 & 1 & 1 & 1 \\ -a_1 & a_1 & a_2 & -a_2 \\ a_3 & a_3 & a_4 & a_4 \\ -a_5 & a_5 & -a_6 & a_6 \end{bmatrix}^{-1} \cdot \begin{bmatrix} F_X \\ K \cdot M_x \\ K \cdot M_y \\ K \cdot M_z \end{bmatrix} \quad (7)$$

As in the case of the first embodiment, the output unit 45 outputs driving signals corresponding to the motor torques $T_{fl}$, $T_{fr}$, $T_{rl}$ and $T_{rr}$ computed by the wheel motor torque command value computing unit 44 to the inverter 23. By so doing, the inverter 23 controls driving electric powers (driving currents) supplied respectively to the in-wheel motors 19 to 22 to drive the in-wheel motors 19 to 22. By so doing, the front left driving force $F_{fl}$, front right driving force $F_{fr}$, rear left driving force $F_{rl}$ and rear right driving force $F_{rr}$ computed by the driving force allocation computing unit 43 are respectively generated by the wheels 11 to 14, and, as a result, the behaviors of the vehicle body Bo, that is, the roll behavior, the pitch behavior and the yaw behavior, may be controlled at the same time without varying the target longitudinal driving force $F_X$.

As can be understood from the above description, according to the second embodiment, when any one of the front left driving force $F_{fl}$, the front right driving force $F_{fr}$, the rear left driving force $F_{rl}$ and the rear right driving force $F_{rr}$ computed by the driving force allocation computing unit 43 exceeds the driving force $F_{limit}$, the gain computing unit 46 is able to compute and determine a gain K. Then, the driving force allocation computing unit 43 is able to compute the front left driving force $F_{fl}$, the front right driving force $F_{fr}$, the rear left driving force $F_{rl}$ and the rear right driving force $F_{rr}$ for achieving the target roll moment $KM_x$, the target pitch moment $KM_y$ and the target yaw moment $KM_z$ that are obtained by applying the gain K computed by the gain computing unit 46 to the target roll moment $M_x$, target pitch moment $M_y$ and target yaw moment $M_z$ computed by the vehicle body behavior control command value computing unit 42.

By so doing, even when any one of the front left driving force $F_{fl}$, front right driving force $F_{fr}$, rear left driving force $F_{rl}$ and rear right driving force $F_{rr}$ computed by the driving force allocation computing unit 43 exceeds the driving force $F_{limit}$, the roll behavior, pitch behavior and yaw behavior of the vehicle body Bo may be controlled at the same time without varying the target longitudinal driving force $F_X$ for causing the vehicle Ve to run. Thus, in the second embodiment as well, as in the case of the first embodiment, it is possible to appropriately control the behaviors of the vehicle body Bo to thereby make it possible to ensure a ride comfort, and it is possible to prevent a variation in vehicle speed (acceleration in the longitudinal direction) resulting from control over the behaviors of the vehicle body Bo, so it is possible to effectively prevent the driver from experiencing a feeling of strangeness.

The aspect of the invention is not limited to the above described embodiments; it may be modified in various forms without departing from the scope of the invention.

For example, in the above embodiments, the front left driving force $F_{fl}$, front right driving force $F_{fr}$, rear left driving force $F_{rl}$ and rear right driving force $F_{rr}$ computed by the driving force allocation computing unit 43 are controlled independently of one another. In this case, driving forces (or braking forces) that the left and right front wheels 11 and 12 respectively generate and driving forces (or braking forces) that the left and right rear wheels 13 and 14 respectively generate may be opposite and their absolute values may be equal to each other so as not to influence the longitudinal motion of the vehicle Ve, that is, so as not to generate the acceleration or deceleration in the vehicle Ve. By so doing, a driving force difference (or a braking force difference) that occurs in the left and right front wheels 11 and 12 and a driving force difference (or a braking force difference) that occurs in the left and right rear wheels 13 and 14 cancel each other, so it is possible to effectively prevent a reduction in longitudinal driving force required to cause the vehicle Ve to run, and advantageous effects similar to those of the above described embodiments may be obtained.

In addition, in the above described embodiments, the driving force allocation computing unit 43 computes the front left driving force $F_{fl}$, the front right driving force $F_{fr}$, the rear left driving force $F_{rl}$ and the rear right driving force $F_{rr}$. In this case, for example, the driving force allocation computing unit 43 may be configured to compute a front wheel-side driving force to be generated by cooperation between the left and right front wheels 11 and 12 and a rear wheel-side driving force to be generated by cooperation between the left and right rear wheels 13 and 14. By so doing as well, advantageous effects similar to those of the above described embodiments may be obtained.

The invention claimed is:

1. A vehicle braking/driving force control system comprising:
    a braking/driving force generating mechanism that causes each wheel of a vehicle to generate driving force or braking force independently of one another;
    a suspension mechanism that couples each of the wheels that are not supported by springs of the vehicle to a vehicle body that is supported by the springs of the vehicle;
    an operating state detecting unit configured to detect a driver's operating state for causing the vehicle to run;
    a motional state detecting unit configured to detect a motional state of the vehicle body while the vehicle is running;
    a vehicle body behavior control value computing unit configured to compute a target longitudinal driving force for causing the vehicle to run on the basis of a detected driver's operating state, and a plurality of target motional state amounts for controlling behaviors of the vehicle body which are a target roll moment, a target pitch moment, and a target yaw moment on the basis of the detected driver's operating state and a detected motional state; and
    a driving force allocation computing unit configured to compute driving forces or braking forces respectively allocated to the wheels so as to achieve a computed target longitudinal driving force and a plurality of computed target motional state amounts which are the target roll moment, the target pitch moment, and the target yaw moment at the same time and that the braking/driving force generating mechanism causes the wheels to respectively generate independently of one another.

2. The braking/driving force control system according to claim 1, wherein
    the driving force allocation computing unit computes driving forces or braking forces that the braking/driving force generating mechanism causes the wheels to respectively generate independently of one another on the basis of arrangement of the wheels and suspension mechanisms of the vehicle using an allocation geometrically determined so as to achieve the computed target longitudinal driving force and the plurality of computed target motional state amounts.

3. The braking/driving force control system according to claim 1, further comprising:
    a gain computing unit that, when allocated and computed driving forces exceeds a maximum driving force of the braking/driving force generating mechanism or when the allocated and computed braking forces exceeds a maximum braking force of the braking/driving force generating mechanism, computes a gain by which driving forces or braking forces for achieving the plurality of computed target motional state amounts within the allocated and computed driving forces or braking forces are reduced.

4. The braking/driving force control system according to claim 3, wherein
    the gain computing unit computes the gain in such a manner that values obtained by subtracting driving forces for achieving the computed target longitudinal driving force within the allocated and computed driving forces from the maximum driving force are divided by the driving forces for achieving the plurality of target motional state amounts or values obtained by subtracting braking forces for achieving the computed target longitudinal driving force within the allocated and computed braking forces from the maximum braking force are divided by the braking forces for achieving the plurality of target motional state amounts.

5. The braking/driving force control system according to claim 3, wherein
    the maximum driving force and the maximum braking force are determined on the basis of a ground contact state of the wheels.

6. The braking/driving force control system according to claim 1, wherein
    the braking/driving force generating mechanism includes electric motors that are respectively assembled to the wheels of the vehicle,
    the braking/driving force control system further comprising a torque computing unit that computes driving torques or braking torques respectively generated by the electric motors in correspondence with the allocated and computed driving forces or braking forces.

7. The braking/driving force control system according to claim 1, wherein
    the braking/driving force generating mechanism causes left and right front wheels and left and right rear wheels of the vehicle to respectively generate driving forces or braking forces independently of each other,
    the driving force allocation computing unit computes driving forces or braking forces that are allocated to the left and right front wheels and the left and right rear wheels in order to achieve the computed target longitudinal driving force and the plurality of computed target motional state amounts and that the braking/driving force generating mechanism causes the left and right front wheels and the left and right rear wheels to respectively generate independently of each other.

8. The braking/driving force control system according to claim 1, further comprising:
    an input unit to which the detected driver's operating state and the detected motional state are input, wherein
    the vehicle body behavior control value computing unit computes a target longitudinal driving force for causing the vehicle to run and a plurality of target motional state amounts for controlling behaviors of the vehicle body on the basis of the driver's operating state and the motional state that are input by the input unit.

9. A braking/driving force control method for use in a vehicle that includes a braking/driving force generating mechanism that causes wheels of the vehicle to respectively generate driving forces or braking forces independently of one another and a suspension mechanism that couples each of the wheels that are not supported by springs of the vehicle to a vehicle body that is supported by the springs of the vehicle, the method comprising the steps of:

detecting a driver's operating state for causing the vehicle to run;

detecting a motional state of the vehicle body while the vehicle is running;

computing a target longitudinal driving force for causing the vehicle to run on the basis of a detected driver's operating state, and a plurality of target motional state amounts for controlling behaviors of the vehicle body which are a target roll moment, a target pitch moment, and a target yaw moment on the basis of the detected driver's operating state and a detected motional state; and computing driving forces or braking forces that are respectively allocated to the wheels so as to achieve a computed target longitudinal driving force and a plurality of computed target motional state amounts which are the target roll moment, the target pitch moment, and the target yaw moment at the same time and that the braking/driving force generating mechanism causes the wheels to respectively generate independently of one another.

* * * * *